US010794836B1

(12) United States Patent
Flynn et al.

(10) Patent No.: US 10,794,836 B1
(45) Date of Patent: Oct. 6, 2020

(54) SYSTEM AND METHOD FOR IN-PROCESS INSPECTION WITHIN ADVANCED MANUFACTURING PROCESSES

(71) Applicant: Triad National Security, LLC, Los Alamos, NM (US)

(72) Inventors: Eric Flynn, Los Alamos, NM (US); EliseAnne Koskelo, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 172 days.

(21) Appl. No.: 15/854,384

(22) Filed: Dec. 26, 2017

Related U.S. Application Data

(60) Provisional application No. 62/439,389, filed on Dec. 27, 2016.

(51) Int. Cl.
G01N 21/88 (2006.01)
G01N 1/28 (2006.01)
(Continued)

(52) U.S. Cl.
CPC ..... *G01N 21/8806* (2013.01); *G01B 9/02002* (2013.01); *G01B 9/02045* (2013.01);
(Continued)

(58) Field of Classification Search
CPC .... G01B 9/02023; G01B 17/04; G01B 17/08; G01B 9/02002; G01B 9/02045;
(Continued)

(56) References Cited

U.S. PATENT DOCUMENTS 3,772,457 A 11/1973 Macovski
4,539,847 A 9/1985 Paap
(Continued)

FOREIGN PATENT DOCUMENTS

CA 2516197 A1 9/2004

OTHER PUBLICATIONS

Castellini et al., "Laser Doppler Vibrometry for Structural Dynamic Characterization of Rotating Machinery," Applied Mechanics and Materials, vol. 415, Sep. 2013, pp. 538-543.
Flynn et al., "High-Speed, Non-Contact, Baseline-Free Imaging of Hidden Defects Using Scanning Laser Measurements of Steady-State Ultrasonic Vibration," Structural Health Monitoring 2013: A Roadmap to Intelligent Structures: Proceedings of the Ninth Int'l Workshop on Structural Health Monitoring, Sep. 10, 2013, pp. 1186-1193.
(Continued)

Primary Examiner — Michael A Lyons
(74) Attorney, Agent, or Firm — LeonardPatel P.C.; Michael Aristo Leonard, II; Sheetal Suresh Patel

(57) ABSTRACT

A system and method can include a laser Doppler vibrometer (LDV) in optical communication with a part during manufacturing and a transducer in ultrasonic communication with the part during manufacturing. The system can also include a controller connected to both the LDV and the transducer. The controller may be configured to cause the transducer to vibrate the part during manufacturing at a predetermined frequency and the LDV may be configured to measure one or more mechanical response types of the part during manufacturing based on one or more optical characteristics of a reflected beam. The controller may further be configured to determine whether a defect is present in the part during manufacturing in response to the one or more mechanical response types of the part.

20 Claims, 8 Drawing Sheets

(51) Int. Cl.
*G01B 9/02* (2006.01)
*G01H 9/00* (2006.01)
*G01N 21/896* (2006.01)

(52) U.S. Cl.
CPC .............. *G01H 9/008* (2013.01); *G01N 1/286* (2013.01); *G01N 21/8851* (2013.01); *G01N 2021/8967* (2013.01); *G01N 2201/02* (2013.01); *G01N 2201/06113* (2013.01)

(58) Field of Classification Search
CPC .... G01H 9/002; G01H 9/008; G01H 9/02002; G01H 9/02045; G01N 21/8851; G01N 2021/8967; G01N 2201/06113
USPC ......................................................... 356/486
See application file for complete search history.

(56) References Cited

U.S. PATENT DOCUMENTS

| | | | |
|---|---|---|---|
| 4,824,250 | A | 4/1989 | Newman |
| 5,062,296 | A | 11/1991 | Migliori |
| 5,956,143 | A | 9/1999 | Kotidis |
| 6,078,397 | A | 6/2000 | Monchalin et al. |
| 6,532,821 | B2 | 3/2003 | Lamouche et al. |
| 6,837,109 | B2 | 1/2005 | Okuno et al. |
| 7,079,258 | B2 | 7/2006 | Selbach et al. |
| 7,116,428 | B2 | 10/2006 | Sauerland et al. |
| 7,278,315 | B1 | 10/2007 | Klein et al. |
| 7,477,398 | B2* | 1/2009 | Lal ..................... G01H 9/002 356/486 |
| 7,649,632 | B2 | 1/2010 | Murray |
| 7,876,453 | B1 | 1/2011 | Williams et al. |
| 7,965,394 | B2 | 6/2011 | Chen et al. |
| 8,004,689 | B2 | 8/2011 | Monchalin et al. |
| 8,144,334 | B2* | 3/2012 | Chinn .................. G01H 9/004 356/482 |
| 8,248,595 | B2* | 8/2012 | Ochiai ................ F22B 37/003 356/237.1 |
| 8,322,221 | B1 | 12/2012 | Sathish et al. |
| 8,497,986 | B2 | 7/2013 | Ochiai et al. |
| 8,531,915 | B2 | 9/2013 | Ammar |
| 2010/0312493 | A1* | 12/2010 | Purekar ................ G01N 17/02 702/35 |
| 2015/0300995 | A1 | 10/2015 | Flynn et al. |
| 2016/0082617 | A1* | 3/2016 | Howe .................... B28B 1/001 264/40.1 |
| 2019/0015901 | A1* | 1/2019 | Haberland ............ G01N 29/12 |

OTHER PUBLICATIONS

Flynn et al., "Structural imaging through local wavenumber estimation of guided waves," NDT&E International, vol. 59, Oct. 2013, pp. 1-10.

Gasparoni et al., "Experimental Modal Analysis on a Rotating Fan Using Tracking-CSLDV," 14 pages (also published as "Experimental Modal Analysis on a Rotating Fan Using Tracking-CSLDV," AIP Conference Proceedings, vol. 1253, No. 1, Jun. 2010, pp. 3-16).

Lee et al., "Repeat scanning technology for laser ultrasonic propagation imaging," Measurement Science and Technology, vol. 24, No. 8, Jun. 20, 2013, 11 pages.

Martarelli et al., "Characterization of Rotating Structures in Coast-down by means of Continuous Tracking Laser Doppler Vibrometer," 8 pages (also published as Martarelli et al., "Characterization of Rotating Structures in Coast-down by means of Continuous Tracking Laser Doppler Vibrometer," Modal Analysis Topics, vol. 3, 2011, pp. 525-532).

Martarelli et al., "Performance analysis of continuous tracking laser Doppler vibrometery applied to rotating structures in coast-down," Meas. Sci. Tech. vol. 23, No. 6, Apr. 30, 2012, 13 pages.

Mechri et al., "Depth-profiling of elastic inhomogeneities in transparent nanoporous low-k materials by picosecond ultrasonic interferometry," Applied Physics Letters, vol. 95, 2009, pp. 091907-1 through 091907-3.

Michaels et al., "Frequency—wavenumber domain methods for analysis of incident and scattered guided wave fields," Proc. of SPIE: Health Monitoring of Structural and Biological System 2009, vol. 7295, 2009, pp. 729513-1 through 729513-12.

Rogge et al., "Characterization of impact damage in composite laminates using guided wavefield imaging and local wavenumber domain analysis," Ultrasonics, vol. 53, No. 7, Sep. 2013, pp. 1217-1226.

Ruzzene, "Frequency—Wavenumber Domain Filtering for Damage Visualization," QNDE 2006: Review of Progress in Quantitative Nondestructive Evaluation, Portland, Ore. Aug. 3, 2006, 32 pages.

Ruzzene, "Frequency—wavenumber domain filtering for improved damage visualization," Smart Mater. Struct., vol. 16, Oct. 8, 2007 pp. 2116-2129.

Salman et al., "Surface wave measurements using a single continuously scanning laser Doppler vibrometer: application to elastography," J. Acoust. Soc. Am., Mar. 2013, vol. 133, No. 3, pp. 1245-1254.

Sinha et al., "Acoustic Sensor for Pipeling Monitoring: Technology Report," Los Alamos Nat'l Lab. Report No. LA-UR-05-6025, document marked Jul. 20, 2005, 23 pages.

\* cited by examiner

SYSTEM AND METHOD FOR IN-PROCESS INSPECTION WITHIN ADVANCED MANUFACTURING PROCESSES

CROSS REFERENCE TO RELATED APPLICATION

This application claims the benefit of U.S. Provisional Application No. 62/439,389, filed Dec. 27, 2016, the subject matter of which is hereby incorporated herein by reference in its entirety.

GOVERNMENT RIGHTS STATEMENT

The present invention was made with government support under Contract No. DE-AC52-06NA25396 awarded by the U.S. Department of Energy/National Nuclear Security Administration to Los Alamos National Security, LLC for the operation of Los Alamos National Laboratory. The government has certain rights in the invention.

FIELD

The present invention relates generally to the field of nondestructive evaluation (NDE), and more particularly, to in-process and in-situ inspection of parts and components made using advanced manufacturing techniques.

BACKGROUND

There is an ever-increasing need to meet safety guidelines for the geometrical, metallurgical, and mechanical properties of a part. Thus, inspection of a part is important for, and integral to, the advanced and additive manufacturing processes. An in-situ inspection process could minimize the costs, inaccuracies, and risks associated with post-manufacturing inspection of parts. According to NASA, the post-inspection process of an additively manufactured part makes up almost twenty-five percent of the additive manufacturing process, resulting in unnecessary costs.

Challenges of nondestructive evaluation (NDE) of additively manufactured parts include, but are not limited to: complex geometry, variable material composition, a lack of currently defined critical defect types, and the lack of current defect studies. Most quality control (QC) approaches for additive manufacturing are post-production, providing a whole-part quality assessment after the part is already fully constructed. Coordinate Measuring Machines (CMMs) are used to measure the geometry of a part post-production. Whole-part inspections can be performed using X-ray and computed tomography (CT) techniques. These techniques, although capable of probing the internal properties of a part, are expensive and have limited sensitivity when applied to large parts. One of the biggest disadvantages of post-production QC is that the entire part must be produced prior to assessment, which leads to wasted machine time and materials if the part does not pass the inspection. More importantly, if inspection is not carried out until after the production is complete, access is restricted to only external faces of the manufactured part. This reduces the ability to detect and locate small defects that are internal to the part.

In-situ inspection processes seek to overcome these challenges by conducting an automated layer-by-layer evaluation of additively manufactured parts. Existing in-situ inspection techniques rely mainly on photographic systems to evaluate a part. One operational system takes a photographic image of each layer as the part is being built and compares that image to the corresponding layer in the CAD model. If the two layers do not correspond, or a defect exists, that layer is "reported" to the system. However, this approach is limited at least in that it analyzes each layer only superficially. For example, the system would be insensitive to improper interlayer mechanical bonding.

Accordingly, there is a need in the art for a robust, improved system and method that can provide real time (or substantially real time) and in-situ verification of the status of a part being constructed by advanced or additive manufacturing techniques.

SUMMARY

Certain embodiments of the present invention may provide solutions to the problems and needs in the art that have not yet been fully identified, appreciated, or solved by conventional inspection technologies. For example, some embodiments pertain to a system that includes a laser Doppler vibrometer (LDV) in optical communication with a part during manufacturing and a transducer in ultrasonic communication with the part during manufacturing. In some embodiments, the system also includes a controller connected to both the LDV and the transducer. The controller may be configured to cause the transducer to vibrate the part during manufacturing at a predetermined frequency or set of frequencies and the LDV may be configured to measure the mechanical response of the vibrating part using one or more optical characteristics of the reflected beam during manufacturing. The controller may further be configured to determine whether a defect is present in the part during manufacturing corresponding to a difference in the measured mechanical response of a part in the defected area.

In some embodiments, a method for in-situ, in-process inspection of advanced manufacturing processes includes transducing a constant ultrasonic vibration in a part during manufacturing by a transducer. The method also includes measuring, by an LDV, the mechanical response of the part during manufacturing based on changes in one or more optical characteristics of the reflected beam and correlating, by a controller, the mechanical response of the part during manufacturing with the presence of a defect in the part during manufacturing. The method can be performed by systems as described herein in some embodiments.

In an embodiment, a system for in-situ, in process inspection of advanced manufacturing processes includes an LDV in optical communication with a part during manufacturing and a transducer in ultrasonic communication with the part during manufacturing. The system also includes a controller connected to both the LDV and the transducer.

In yet another embodiment, a method for in-situ, in-process inspection of advanced manufacturing processes includes transducing a constant ultrasonic vibration in a part during manufacturing, by a transducer. The part includes one or more layers. The method also includes emitting laser light at one or more frequencies, by an LDV, and measuring, by the LDV, one or more mechanical response types of the part during manufacturing based on one or more optical characteristics of a reflected beam of the emitted laser light reflected back from the part. The method further includes correlating, by a controller, the one or more mechanical response types of the part during manufacturing with presence of a defect in the part during manufacturing.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

As described herein, a system and method for in-situ, in-process inspection of advanced manufacturing processes can provide numerous advantages over the current state of art. For instance, the system and method of some embodiments may permit real-time or near real-time identification of defects, abnormalities, malfunctions, or other undesirable aspects of a part being manufacturing using advanced or additive manufacturing. As such, a part being made utilizing the system and method of some embodiments will have a live, continuous assessment throughout the manufacturing process as to its quality control and fitness for operation, thus saving significant time, effort, and resources in the assurance procedures associated with advanced manufacturing. These and other features and advantages of the preferred system and method for in-process inspection of advanced manufacturing processes of some embodiments are described below.

Figure 1A:
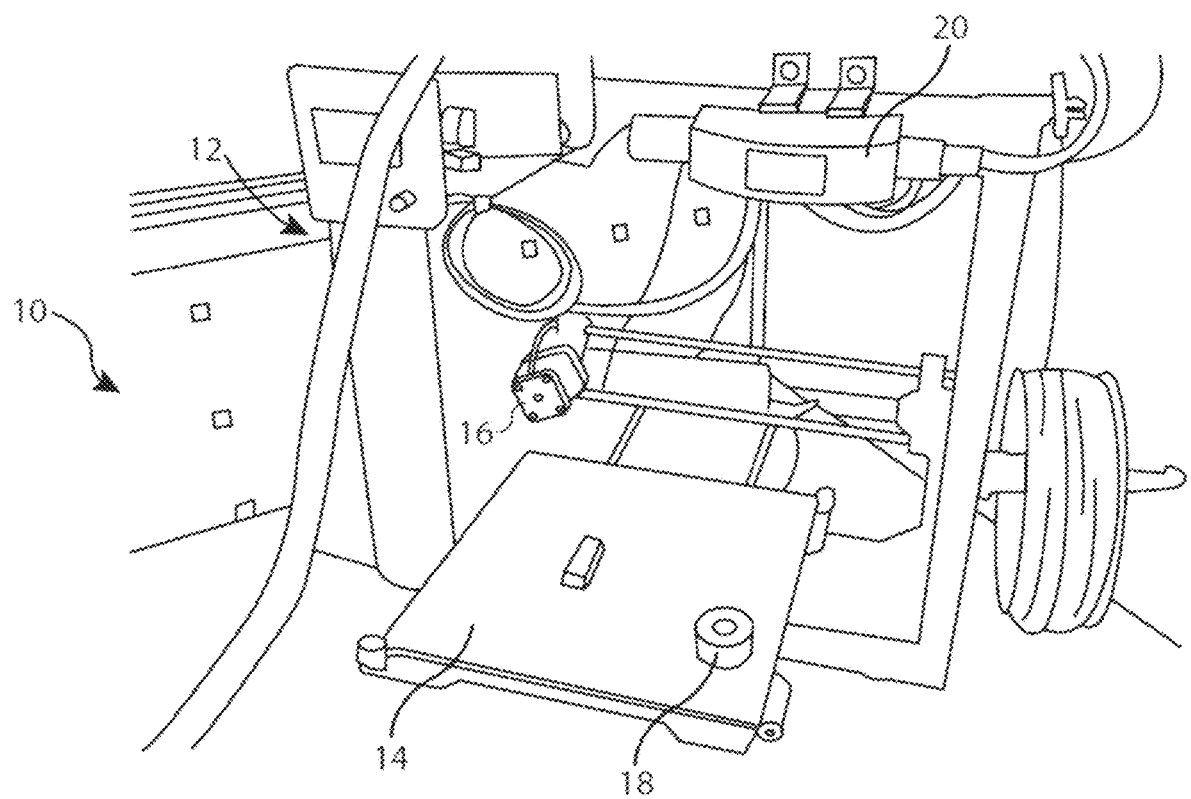
FIG. 1A a perspective view of an example system for in-situ, in-process inspection of advanced manufacturing processes, according to an embodiment of the present invention.
Figure 1B:
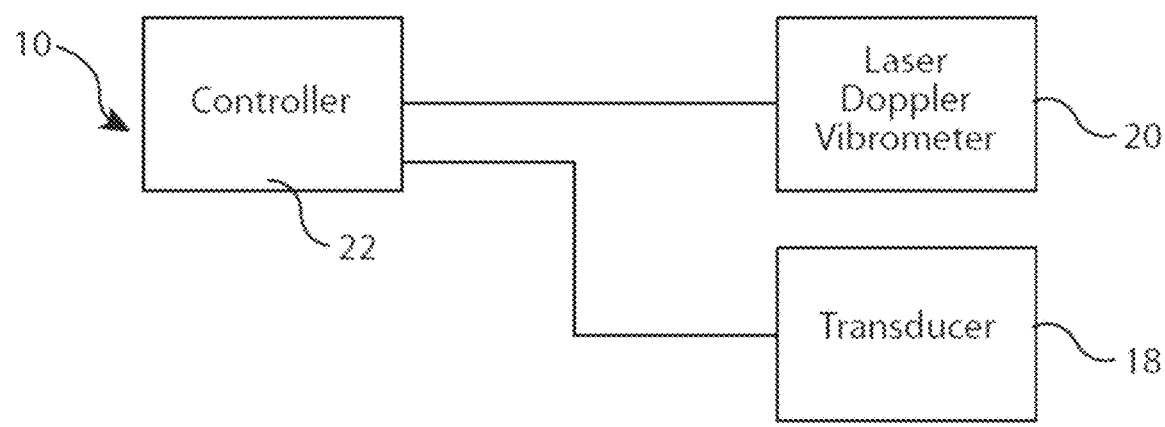
FIG. 1B is a schematic block diagram of a system for in-process inspection of advanced manufacturing processes, according to an embodiment of the present invention.

As shown in FIGS. 1A and 1B, a system 10 for in-situ, in-process inspection of advanced manufacturing processes of an embodiment can include a laser Doppler vibrometer (LDV) 20 in optical communication with a part during manufacturing and a transducer 18 in ultrasonic communication with the part during manufacturing. The system 10 can also include a controller 22 connected to both the LDV 20 and the transducer 18. The controller 22 may be configured to cause the transducer 18 to vibrate the part during manufacturing at a predetermined frequency and the LDV 20 may be configured to measure the mechanical response of the part during manufacturing based on one or more optical characteristics of the reflected beam of the LDV. The controller 22 may be further configured to determine whether a defect is present in the part during manufacturing based on the mechanical response of the illuminated region of the part. The system 10 functions to monitor, determine, detect, analyze, catalogue, and/or inform a user and/or maker about the condition of a part being manufactured in real time or near real time.

As shown in FIGS. 1A and 1B, the system 10 can include a LDV 20 that is in optical communication with a part being manufactured. The LDV 20 may function to illuminate the part with laser light emitted at one or more frequencies and then receive a reflection of the emitted laser light from the part during the manufacturing process. As described in more detail below, changes in the characteristics of the reflected beam (e.g., wavelength) can be indicative of the part's mechanical response to the excitation (in terms of displacement, velocity, acceleration, or strain) for the specific illuminated region. Differences in the recorded mechanical response of the part for the illuminated region, such as such as differences in spatial wavelength, spatial wavenumber, wave velocity, and wave amplitude, provide insight into the part's structural features, including, for example, potential structural defects and/or abnormalities. The LDV 20 can include and/or be connected to one or more mirrors that can be placed at predetermined locations to deliver a desired amount of coverage around the part being manufactured. The LDV 20 can include and/or be connected to a data acquisition system, either separately or as a module of the controller 22. The data acquisition system may function to convert received optical characteristics of the reflected beam into a map or representation of the mechanical response of the part that is indicative of the structural features of the part.

As shown in FIGS. 1A and 1B, the system 10 can also include a transducer 18 that is in ultrasonic communication with the part during manufacturing. The transducer 18 may function to excite, stimulate, couple, cause, and/or transmit one or more ultrasonic vibrations in the part during the manufacturing process such that the part is subject to continuous, semi-continuous, quasi-continuous, and/or substantially continuous vibrations. As described herein, the vibrations in the part are optically communicated to the LDV 20 in such a manner that a difference in vibration is indicated by a difference in the optical characteristics of the beam being reflected back to the LDV 20. As shown in FIGS. 1A and 1B, the system 10 can be mounted on and/or integral with an existing additive or advanced manufacturing machine 12 that includes at least one printer 16 that is configured for printing or layering an object from a source material. In one example configuration shown in FIG. 1A, the machine can include a platform 14 upon which the manufacturing process of the part is carried out. In such an example embodiment, the transducer 18 can also be mounted on the platform 14 such that the platform 14 functions to transmit and/or couple the vibrations of the transducer 18 to the part. In alternative embodiments, the transducer 18 can be mounted separately from the part such that the ultrasonic vibrations are transmitted through other suitable means or mechanisms, for example through one or more wires, conduits, extensions, liquids, gases, mechanical media, solid media, non-solid media, or any combination thereof, for transmitting ultrasonic signals.

As shown in FIG. 1B, the system 10 can also include a controller 22 connected to both the LDV 20 and the transducer 18. The controller 22 may function to cause, determine, correlate, analyze, detect, and/or control one or more of the input or output non-transitory signals directed to/from the LDV 20 and/or the transducer 18. The controller 22 may be configured to cause the transducer 18 to vibrate the part during manufacturing at a predetermined frequency, and further to determine whether a defect is present in the part during manufacturing based on the mechanical response of the part measured by a change in one or more optical characteristics of the reflected beam at the LDV 20. As noted above, the controller 22 can include one or more modules, and the controller 22 can be centralized or distributed within one or more of the other components of the example embodiments. For example, the controller 22 can be integral or partially integral with the machine 12 itself, or integral or partially integral with the LDV 20 or transducer 18. Alternatively, the controller 22 can be centralized and networked with one or more systems 10 subsystems such that one controller 22 functions to control more than one manufacturing process operating at more than one set of machines 12. The controller 22 can include multiple components or modules (e.g., general purpose computer, oscillator, amplifier, LDV subsystem, printer, etc.), or the controller 22 can include a single integrated or substantially integrated unit that is connected to and functions with each of the other components of the preferred system 10.

Figure 2:
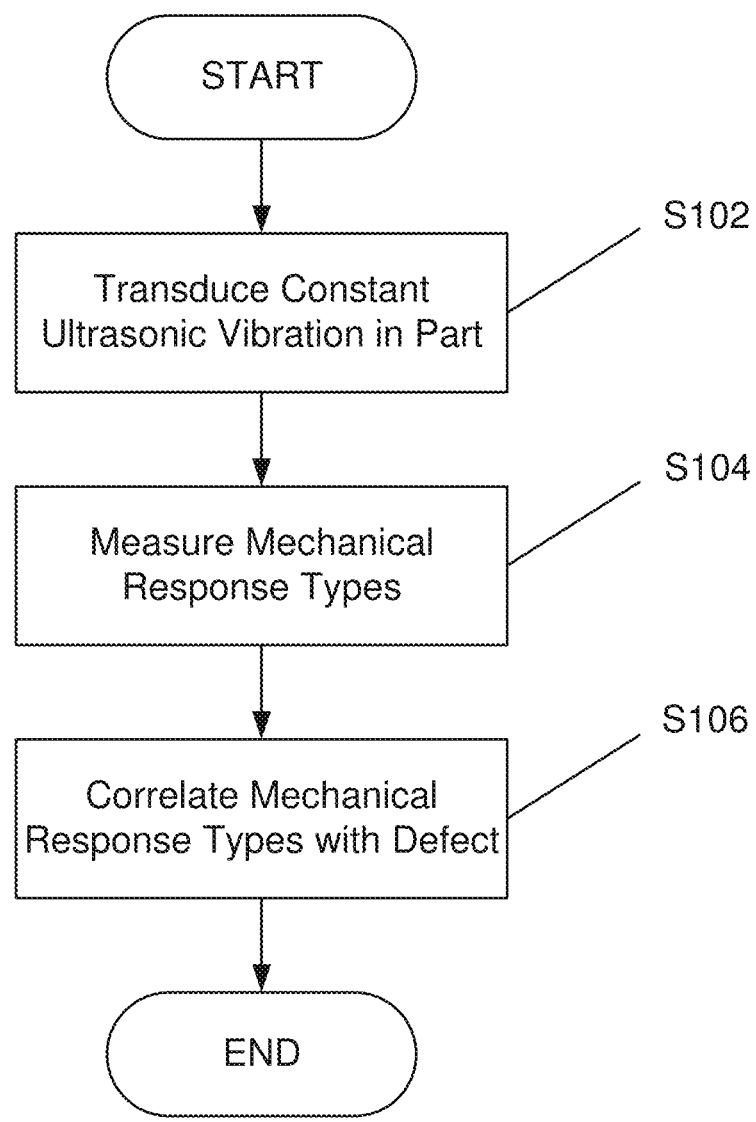
FIG. 2 is a flowchart depicting a method for in-process inspection of advanced manufacturing processes, according to an embodiment of the present invention.

As shown in FIG. 2, a method 100 for in-situ, in-process inspection of advanced manufacturing processes can include transducing, by a transducer, a constant ultrasonic vibration in a part during manufacturing at S102. The method 100 can also measuring, by an LDV, responsive to laser light emitted by the LDV at one or more frequencies, one or more mechanical response types of the part during manufacturing based on one or more optical characteristics of a reflected beam at S104. The method 100 can also include correlating, by a controller, the one or more mechanical response types of the part during manufacturing with the presence of a defect in the part during manufacturing at S106. The method 100 can be performed by a system 10 of the type described herein, or by one or more subsystems or components of the system 10 described herein that are arranged, programmed, and/or configured for performing the blocks of the method in any suitable manner or sequence.

As shown in FIG. 2, block S102 of the preferred method 100 discloses transducing, by a transducer, a constant ultrasonic vibration in a part during manufacturing. Block S102 may be performed by a transducer 18 of the type described above with reference to the system 10. Block S102 may function to excite, stimulate, couple, cause, and/or transmit one or more ultrasonic vibrations in the part during the manufacturing process such that the part is subject to continuous, semi-continuous, quasi-continuous, and/or substantially continuous vibrations. As described above, the induced vibrations in the part are optically communicated to the LDV in such a manner that a difference in vibration or mechanical response of the part is indicated by a difference in the optical characteristics of the beam being reflected back to the LDV. In one alternative of the method 100, block S102 can use a platform or other common structural feature of an advanced manufacturing machine to transmit and/or couple the vibrations of the transducer to the part. In other alternative embodiments, the ultrasonic vibrations can be transmitted through other suitable means or mechanisms, including for example through one or more wires, conduits, extensions, liquids, gases, or other mechanical, solid, or non-solid media for transmitting ultrasonic signals.

As shown in FIG. 2, the method 100 can also include block S104, which discloses measuring, by an LDV, one or more of the mechanical response types of the part during manufacturing based on differences in the optical characteristics of the reflected beam. Block S104 may function to illuminate the part with laser light of one or more frequencies and then receive a reflection of the laser light from the part during the manufacturing process. As described in more detail below, changes in the optical characteristics of the reflected beam (e.g., wavelength characteristics) can be indicative of the part's mechanical response to the excitation (in terms of displacement, velocity, acceleration, or strain) for the specific illuminated region. Differences in the recorded mechanical response of the part for the illuminated region provide insight into the part's structural features, including, for example, potential structural defects and/or abnormalities. As noted above, the LDV can include and/or be connected to a data acquisition system, either separately or as a module of a controller. The data acquisition system preferably functions to convert received optical characteristics of the reflected beam into a map or representation of the mechanical response of the part that is indicative of the structural features of the part.

As shown in FIG. 2, the method 100 can also include block S106, which discloses correlating, by a controller, one or more of the mechanical response types of the part as measured during manufacturing by a change in one or more of the optical characteristics of the reflected beam of the LDV with the presence of a defect in the part during manufacturing. Block S106 may function to compute, determine, analyze, link, inform, and/or correlate the one or more mechanical response types of the part measured by a change in optical characteristics of the reflected beam of the LDV with the presence or absence of a defect in the part. Block S106 can be performed by a controller of the type described above with reference to FIGS. 1A and 1B. As noted herein, the controller can include one or more modules, and it can be centralized or distributed within one or more other components, systems, or subsystems that are configured to perform the requisite function(s). As noted above, a suitable controller can be integral or partially integral with the machine itself, or integral or partially integral with the LDV or transducer. Alternatively, the controller can be centralized and networked such that one controller functions to control more than one manufacturing process operating at more than one set of machines. A suitable controller can include multiple components or modules (e.g., general purpose computer, oscillator, LDV subsystem, printer, etc.), or the controller can include a single integrated or substantially integrated unit that is connected to and functions with each of the other components to perform at least one or more blocks of the method 100.

In operation, excitation of the part results in a mechanical response at the part which can be recorded via scanning by the LDV. The recorded mechanical response of the part includes an amplitude and a phase for each point in the inspection area. Accordingly, each layer of the part has its own map of the response of the part to the induced vibrations, which can be assembled together to produce a volume measurement of the entire part.

A curve of amplitude versus spatial wavenumber may be computed by the controller for each layer of the part. Local print quality can then be inferred if there are changes in either amplitude or wavenumber. As an example, an increased amplitude or higher energy wavenumber can be indicative of a poorly bonded section since a weaker bond will lead to a lower effective local material stiffness, which leads to a higher amplitude response and lower local wavenumber. In alternative embodiments, the response mapping procedure is repeated for each harmonic of the excitation frequency or nonlinearly-mixed harmonics of multiple frequencies. As described and shown below, strong harmonic response evidenced by the amplitudes of the harmonic responses can be indicative of small, local defects such as cracking or microvoids.

Referring back to FIG. 1A, an example embodiment of the present invention was developed and tested. The example embodiment included a TAZ Lulzbot 5™ printer with a dual-axes table, 300 mm by 300 mm. The printer featured a single extrusion nozzle (0.35 mm) and parts were printed in black ABS 3.0 mm filament with 100 percent fill density. Each part was printed at coordinates (120 mm, 120 mm) and a laser Doppler vibrometer and two Galvo steering mirrors were mounted directly above the part along the top of the 3D-printer chassis using C-clamps as shown in FIG. 1A. The print bed was set to a standard temperature of 110 degrees Celsius and the extrusion nozzle was set to 230 degrees Celsius. To excite the 3D-printed part with a single-tone ultrasonic signal, a piezoelectric pre-stressed sandwich transducer was mounted to the print bed using epoxy at the coordinates (260 mm, 20 mm).

A 15 V power source for the two steering mirrors, the LDV power source, and an amplifier were all placed on a neighboring tripod along with the Polytec™ vibrometer controller and the National Instruments™ Data Acquisition System. The 3D printer and ultrasonic scanning system were both controlled by a personal computer (PC) via universal serial bus (USB) connections.

The TAZ Lulzbot 5™ is controlled through a programming language known as g-code. G-code consists of a library of commands that may be sent to a 3D-printer, including where the nozzle head should print and for what length of time. Additional commands also allow one to pause a print in order to execute additional actions. In the example method, a slicing engine, Slic3r, was used to create custom g-code that conducted one inspection scan after each layer of the part was printed.

In an example method, a single tone, continuous excitation is introduced to the part. In the example method, the excitation source was attached to the build plate and the ultrasonic energy was coupled into the part from its base. A scanning LDV is then swept continuously over the part in raster pattern, and the continuous velocity response stream is captured by a data acquisition unit. As the stream is being acquired, it is broken into equal length blocks, where each block corresponds to one "pixel" in the raster scan pattern. The discrete Fourier transform is applied to each block for the excitation frequency, providing a single complex value for each pixel that represents the quadrature components of the response at the frequency. When the scan is complete, this provides a full-field response measurement over the scan area. The magnitude of the complex-valued map provides the pixel-by-pixel response amplitude.

To estimate local wavenumber, the complex-valued response map is passed through a bank of narrowband-spatial-wavenumber filters with varying central wavenumbers. The result of each filter is spatially enveloped using the monogenic signal, producing a set of amplitude maps according to wavenumber. For each pixel, the wavenumber that produced the strongest response at that pixel, according to the spatial envelope, is assigned as the wavenumber estimate for that pixel. Processing all the pixels in this way leads a map of local wavenumber estimates, as understood by those of ordinary skill in the art.

Before each scan, the g-code paused the print process and moved the print head and nozzle out of the scan area. During each scan, a single-tone ultrasonic excitation of 80.5 KHz was transmitted through the print bed to the part via the piezo electric transducer. The scan rate was set to 2000 pixels/s and the scan area measured 414 pixels tall by 206 pixels wide. Several cycles of the response at each pixel were measured using the LDV to estimate the local amplitude and phase.

Figure 3:
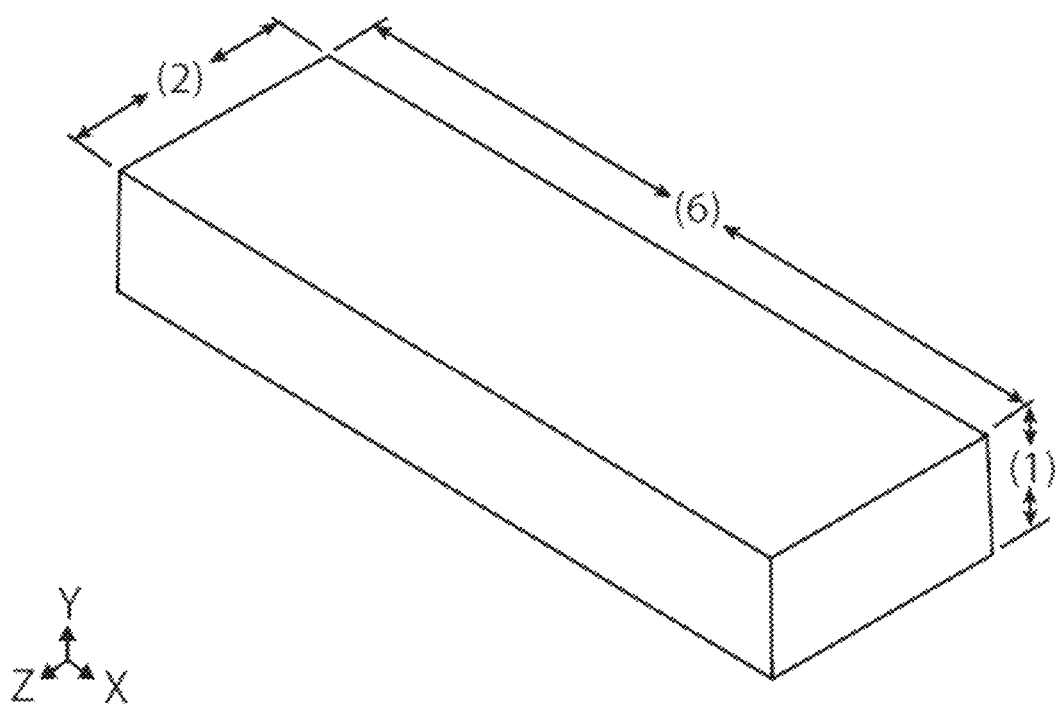
FIG. 3 is a perspective view of a "healthy" test part used in an example embodiment of the system and method of the present invention.

The g-code for each 3D-printed part was revised so that between layers, the PC would call an external program to execute the inspection scan. In the program, two specific commands are executed. First, the program instructs the DAQ to generate a sinusoidal excitation at 80.5 KHz which is then amplified by the amplifier with a gain setting of 20. Second, the laser Doppler vibrometer is directed to scan across a defined scan region and directed by the two Galvo steering mirrors. The magnitude and phase of the 80.5 KHz response is estimated at each pixel to provide a full-field, steady state response. In order to test the example system and method, a 6 cm long by 2 cm wide by 1 cm tall cuboid was printed using ABS plastic. An initial "healthy" print without any imposed damage was created as an experimental control, shown in FIG. 3.

Figure 4:
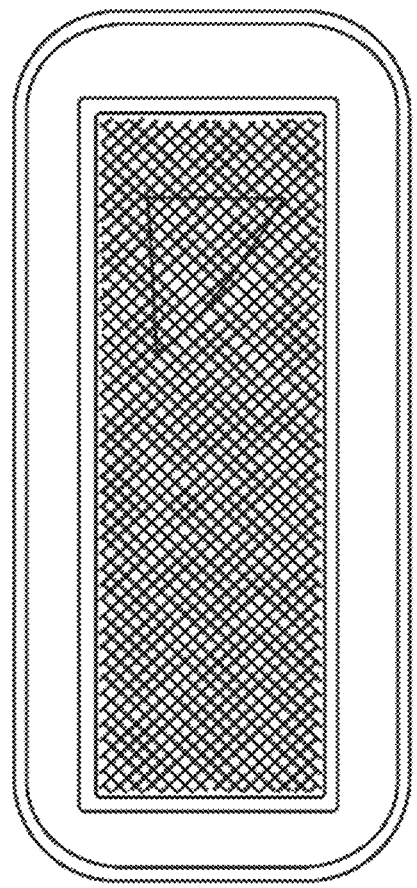
FIG. 4 is a plan view of a foreign object within a part used in an example embodiment of the system and method of the present invention.
Figure 5:
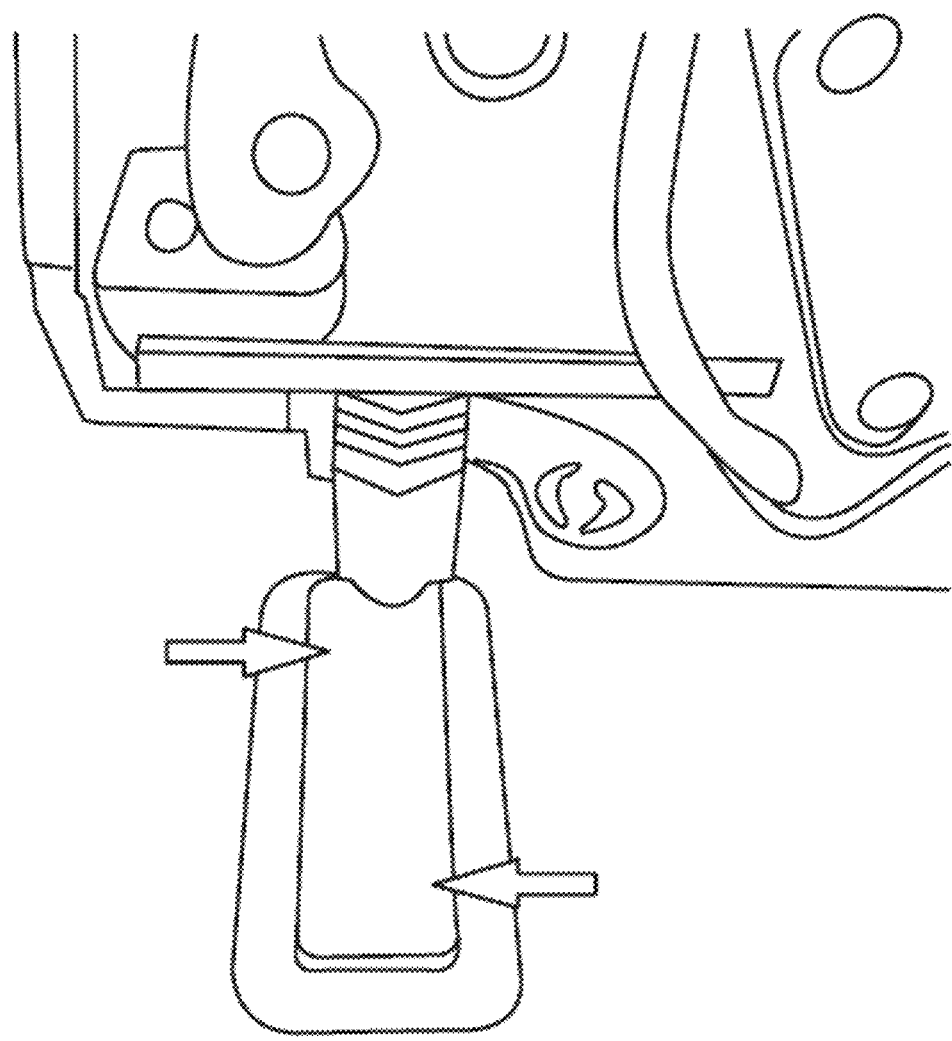
FIG. 5 is a perspective view of a locally heat damaged part used in an example embodiment of the system and method of the present invention.

The second print measured the effects of foreign object damage (FOD) on the composition and structural properties of the 3D-printed cube. FOD was created through the addition of triangle-shaped section of electrical tape, approximately 1 cm by 1 cm, to the top of the unfinished part, specifically during the printing of the $27^{th}$ layer, shown in FIG. 4. Likewise, a third print was conducted, investigating the effects of localized heating damage on the 3D-printed cube during the printing process as pictured in FIG. 5. A soldering iron heated to 300 degrees Fahrenheit was used to create two holes, approximately 5 mm deep and 5 mm in diameter, in the $20^{th}$ layer of the print. The first hole was located in the upper left corner of the 3D-printed part, 1 cm from the top edge of the print and 2 mm from its leftmost edge. The second hole was introduced in the lower half of the 3D-printed part, 5 mm from its leftmost edge and 5 mm from its bottom edge.

Figure 6A:
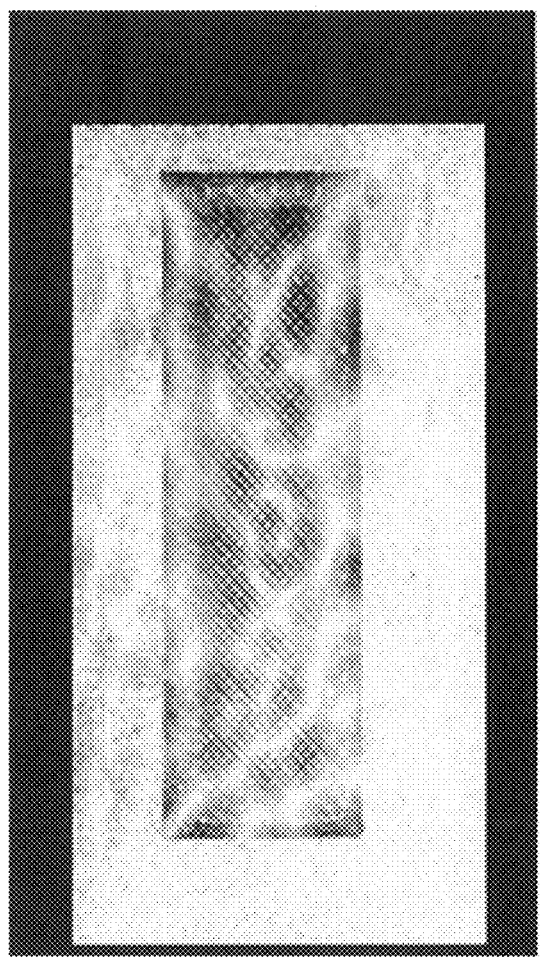
FIG. 6A is an image of the magnitude response of the healthy part used in an example embodiment of the system and method of the present invention.
Figure 6B:
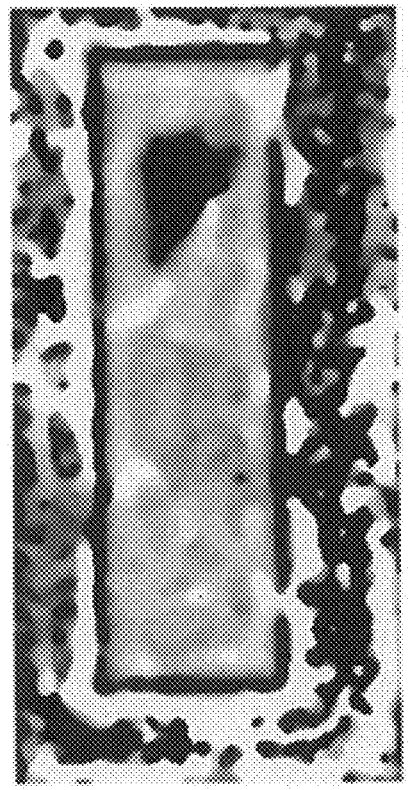
FIG. 6B is an image of the wavenumber response of the FOD part used in an example embodiment of the system and method of the present invention.
Figure 6C:
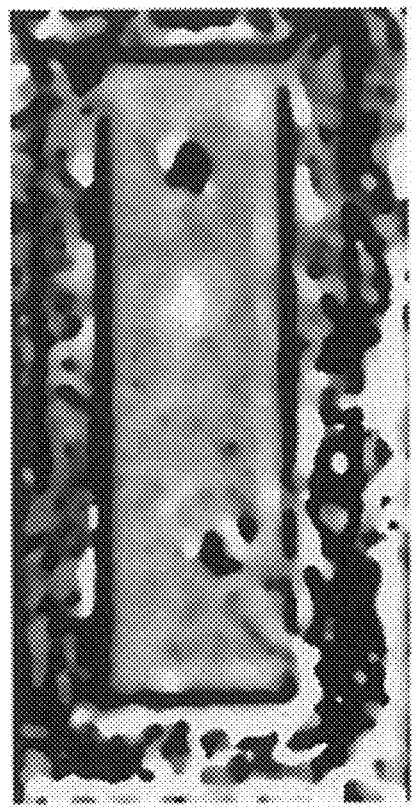
FIG. 6C is an image of wavenumber response of the locally heat damaged part used in an example embodiment of the system and method of the present invention.

In the example system and method, the AWS inspection system measures the velocity response of the 3D-printed part based on changes in wavelength of the reflected beam of the LDV in terms of the quadrature components, which are stored as the real and imaginary parts of a complex-valued map. The magnitude of the velocity response provided the most information in terms of size, shape, and nature of the introduced defect in a part. Damage manifests itself as areas of increased magnitude response and greater wavenumber. For the "healthy" print, no such damage was detected. FIGS. 6A, 6B, and 6C depict the output of the example system and method, illustrating the structural integrity of the control block (A), the FOD (B), and the heat damage (C). FIG. 6A is an image of the magnitude response (real plus imaginary parts) of the healthy part. FIG. 6B is an image of the wavenumber response for the FOD part, showing the foreign object at layer 31. FIG. 6C is an image of the wavenumber response for the localized heat damaged part, showing the damage induced at the $21^{st}$ layer of the print. Although exemplified and described with reference to a plastic example part, the preferred system and method can be applied to any type of advanced manufacturing media, including metals and other types of composite, quasi-biological, biological substitute, or other synthetic materials.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, random access memory (RAM). The computer program instructions may also be stored in other non-transitory computer readable media such as, for example, a CD-ROM, flash drive, or the like. Also, a person of ordinary skill in the art should recognize that the functionality of various computing devices may be combined or integrated into a single computing device, or the functionality of a particular computing device may be distributed across one or more other computing devices without departing from the spirit and scope of the exemplary embodiments of the present invention.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While this invention has been described in detail with particular references to preferred and illustrative embodiments thereof, the embodiments described herein are not intended to be exhaustive or to limit the scope of the invention to the exact forms disclosed. Persons of ordinary skill in the art and technology to which this invention pertains will appreciate that alterations and changes in the described structures and methods of assembly and operation can be practiced without meaningfully departing from the principles, spirit, and scope of this invention, as set forth in the following claims and equivalents thereof. In order to determine the metes and bounds of the invention, therefore, reference should be made to the appended claims.

What is claimed is:

1. A system for in-situ, in process inspection of advanced manufacturing processes, comprising:
   a laser Doppler vibrometer (LDV) in optical communication with a part during manufacturing, the LDV configured to emit a laser light and to measure a mechanical response of the part to vibrations using reflections off the part from the emitted laser light, the part comprising a plurality of layers;
   a transducer in ultrasonic communication with the part during manufacturing, the transducer configured to impart the vibrations on the part directly or indirectly; and
   a controller connected to both the LDV and the transducer and configured to cause the transducer to vibrate the part, the controller further configured to:
      compute a curve of amplitude versus spatial wavenumber for each layer of the part,
      convert received optical characteristics of the reflected beam into a map or representation of the mechanical response of the part in the amplitude or the spatial wavenumber that is indicative of structural features of the part,
      repeat the conversion of the received optical characteristics of the reflected beam into the map or representation for each harmonic of a plurality of harmonics of an excitation frequency of the vibrations or nonlinearly-mixed harmonics of multiple frequencies of the vibrations, and
      determine whether changes to the amplitude or the spatial wavenumber occur for a layer of the part.

2. The system of claim 1, wherein the controller is in communication with the LDV and the transducer is configured to vibrate at a predetermined frequency.

3. The system of claim 1, wherein the transducer is in ultrasonic communication with a platform during manufacturing.

4. The system of claim 1, wherein the transducer is configured to transmit ultrasonic vibrations in a platform such that the part is subject to continuous vibrations.

5. The system of claim 1, wherein the transducer is configured to transmit ultrasonic vibrations in a platform such that the part is subject to semi-continuous vibrations.

6. The system of claim 1, wherein the transducer is configured to transmit ultrasonic vibrations in a platform such that the part is subject to intermittent vibrations.

7. The system of claim 1, wherein the transducer is configured to transmit ultrasonic vibrations in the part such that the part is subject to continuous vibrations.

8. The system of claim 1, wherein the transducer is configured to transmit ultrasonic vibrations in the part such that the part is subject to semi-continuous vibrations.

9. The system of claim 1, wherein the transducer is configured to transmit ultrasonic vibrations in the part such that the part is subject to intermittent vibrations.

10. The system of claim 1, wherein the transducer is configured to transmit ultrasonic vibrations via one or more wires, conduits, extensions, liquids, gases, mechanical, solid, or non-solid media, or any combination thereof.

11. The system of claim 1, wherein the controller is configured to determine that a defect is present in the part during manufacturing when the changes to the amplitude or the spatial wavenumber in the layer of the part occur.

12. The system of claim 1, wherein the LDV is configured to emit the laser light at a plurality of frequencies.

13. The system of claim 1, wherein the LDV is in optical communication with a plurality of mirrors placed at predetermined locations to be in optical communication with areas of the part being manufactured.

14. The system of claim 1, wherein the LDV is configured to transmit data to a data acquisition system.

15. The system of claim 1, wherein
   the conversion of the optical characteristics of the reflected beam into the map or representation of the mechanical responses of the part is performed for each of the plurality of layers of the part, producing a map or representation for each layer, and
   the controller is further configured to assemble the maps or representations for the plurality of layers of the part together to produce a volume measurement of the entire part.

16. The system of claim 1, wherein the measured mechanical response of the part comprises an amplitude and a phase for each point in an inspection area.

17. The system of claim 1, wherein when changes to the amplitude or the spatial wavenumber are determined to occur for a layer of the part, the controller is further configured to infer local print quality from the changes to the amplitude or the spatial wavenumber.

18. The system of claim 17, wherein the inferring of the local print quality comprises determining that an increased amplitude or a higher energy spatial wavenumber is indicative of a poorly bonded section of the part or determining that a harmonic response to the plurality of harmonics is indicative of cracking or microvoids.

19. A method for in-situ, in-process inspection of advanced manufacturing processes, comprising:
   transducing an ultrasonic vibration in a part during manufacturing directly or indirectly, by a transducer, wherein the part comprises a plurality of layers;
   emitting laser light at one or more frequencies, by a laser Doppler vibrometer (LDV);
   measuring, by the LDV, mechanical responses of the part to excitation during manufacturing based on one or more optical characteristics of a reflected beam from the emitted laser light reflected back from the part after each of the plurality of layers of the part is printed;
   computing, by a controller, a curve of amplitude versus spatial wavenumber for each layer of the part;
   converting, by the controller, the optical characteristics of the reflected beam into a map or representation of the mechanical responses of the part in the amplitude or the spatial wavenumber that is indicative of structural features of the part; and
   repeating, by the controller, the conversion of the received optical characteristics of the reflected beam into the map or representation for each harmonic of a plurality of harmonics of an excitation frequency of the vibrations or nonlinearly-mixed harmonics of multiple frequencies of the vibrations.

20. A system, comprising:
   a laser Doppler vibrometer (LDV) in optical communication with a part comprising a plurality of layers during manufacturing, the LDV configured to emit a laser light and to measure a mechanical response of the part to vibrations using reflections off the part from the emitted laser light;

a transducer configured to impart the vibrations on the part directly or indirectly; and a controller connected to both the LDV and the transducer, the controller configured to:

control the LDV, cause the transducer to vibrate the part, compute a curve of amplitude versus spatial wavenumber for each layer of the part, convert received optical characteristics of the reflected beam into a map or representation of the mechanical response of the part in the amplitude or the spatial wavenumber that is indicative of structural features of the part, and repeat the conversion of the received optical characteristics of the reflected beam into the map or representation for each harmonic of a plurality of harmonics of an excitation frequency of the vibrations or nonlinearly-mixed harmonics of multiple frequencies of the vibrations.

\* \* \* \* \*